July 7, 1970 G. R. OHLSON 3,519,120
CONVEYOR
Filed June 28, 1968
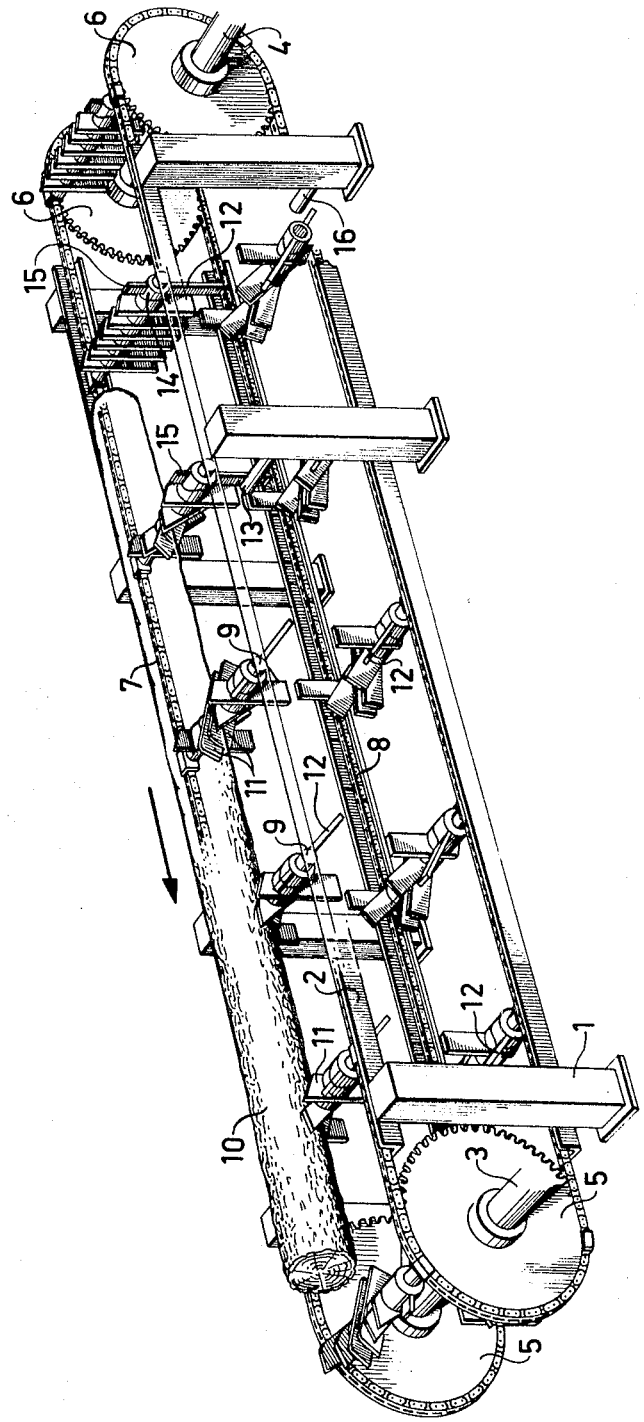

3,519,120
CONVEYOR
Gunnar Reidar Ohlson, 640 10 Jogsjo, Hogsjo, Sweden
Filed June 28, 1968, Ser. No. 740,989
Int. Cl. B65g 15/00, 17/00
U.S. Cl. 198—131                    10 Claims

ABSTRACT OF THE DISCLOSURE

A conveyor for elongated objects such as logs comprising a support framework, a pair of driven endless flexible members defining upper and lower flights, the upper flight moving in the direction of movement of conveyed objects, a plurality of spaced support means carried between said driven endless members, and a plurality of load support members carried by each of said support means in spaced relationship to one another, each of said load support members being swingably carried by the associated support means with the center of gravity of each of the load support members spaced from the swinging axis thereof whereby the load support members automatically conform to the shape of a conveyed object.

---

When in a saw mill a log shall be divided into individual boards or battens it is general practice first to center or position the log so that, before arriving to the saw, it is oriented in such as way that the sawing may be carried out under optimal conditions as far as the material yield is concern. The positioning takes place partly by turning of the log in a horizontal plane and partly by rotation of it around its longitudinal axis. To obtain continuous utilization of the sawing machine the positioning device is not located immediately in front of the saw but in such a place that during sawing of one log the next succeeding one is simultaneously positioned. Accordingly, a separate conveyor must be used to feed the log to the saw and during that transport it is, of course, vital that the relative position of the log is preserved. Various kinds of conveyors alleged to fulfill that condition are previously known, among them devices having feeder rollers provided with teeth or composed by a plurality of disks having circumferential ribs and grooves et cetera. It has also been suggested to use endless chains with hook-like pivoted arms gripping into the log from above.

The main object of the invention is to provide a conveyor or a feeding device, respectively, which is of very simple design and accordingly can be manufactured at low costs.

Another object of the invention is to provide a conveyor of very reliable operation.

A further object of the invention is to provide a conveyor of such a design that, during transport of a subject by means thereof, said subject is accurately maintained in its desired position.

The invention relates to a conveyor of the type comprising two endless chains running in the direction of transport on either side of the subject and bridged by equally spaced transversal shafts carrying means for supporting the subject during transport. According to the main characteristic of the invention said means are constituted by a number of members swingably mounted side by side on said transversal shafts and having their centres of gravity located below the shafts so that, when not subjected to any external forces, said members are by gravity held in predetermined positions.

One embodiment of the invention will now be described in greater detail, reference being made to the accompanying diagrammatic drawing.

Reference numeral 1 designates a number of uprights or columns supporting horizontal bars 2, suitably of L-shaped cross-section. Columns 1 and bars 2 are parts of the frame of the machine which also comprises bearings, not shown, for two shafts 3 and 4, one of which is driven. Shafts 3 and 4 do each carry two sprocket wheels 5 and 6 pairwise in engagement with one of two endless chains 7 and 8. Between wheels 5 and 6 chains 7 and 8 run in said bars 2 which accordingly serve as guiding rails for the chains. The latter support a number of equally spaced lateral shafts 9 carrying the members intended to support the subject to be transported, here shown as a log 10 of comparatively small diameter being on its way to a saw, e.g. a band saw or a circular saw. According to the embodiment illustrated the supporting members are constituted by a number of disk-like elements 11 disposed side by side on each shaft 9. They are of substantially rectangular shape and mounted on shafts 9 so that their centres of gravity are located below the shafts. As is easily understood, this means that normally the supporting members assume vertical rest positions as shown to the right on the drawing. The drawing does also illustrate that the disk-like members are at their top ends curved or cut obliquely backwards in the direction of transport which has been marked with an arrow. Further it appears from the drawing that in accordance with the selected embodiment each set of members 11 have a greater width than the diameter of log 10. Outside the set there is at one side of each shaft a pivoted arm 12 having a shorter upper portion 15 and a longer lower portion in the trajectory of which there is a trip dog 13, here shown as a rod projecting from the machine frame. In practice, dog 13 is suitably resilient or horizontally displaceable for adjustment purposes.

When a log has been carried over on to the conveyor, thanks to the shape of members 11, they will swing around their respective shafts 9 and assume forwardly tilting positions as shown in the middle and to the left on the drawing. The amount of rotation will be different in response to the actual cross-section of the log, i.e. the individual elements 11 within each set will assume such positions that they do automatically match the contour of the log. Should the log have twig rests, bends or other irregularities these cannot develop any lateral forces which might dislocate the log from its selected position. Moreover, thanks to this individual freedom of movement of members 11, the log will be supported not only from below but also at both sides of its bottom line of contact which does further increase the stabilizing effect.

In accordance with a further feature of the invention the holding of the log on the conveyor may be made still more secure, viz. by an arrangement which, upon completed matching of each set of members 11 to the actual profile of the log, keep the individual members temporarily locked in their positions. In the embodiment shown this blocking of members 11 is carried out by means of arms 12. When such an arm encounters the rod 13 it is forced to swing in a counter-clockwise direction generating a corresponding rotation of the sleeve 14 serving as a mounting for the arm on shaft 9. At its one end sleeve 14 is obliquely cut, i.e. its end surface is not located in a radial plane, and in the starting position this surface is in firm contact with a correspondingly shaped end surface either of the bearing sleeve for the adjacent element 11 or of a special intermediate sleeve. The two sleeves could be looked upon as an expander device which by wedging action transform the swinging movement of arm 12 into a movement parallel with shaft 9. The latter movement generates a clamping or jamming force blocking the elements in their positions. When elements 11 within any given set have lost their contact with a log and passed the front pair of wheels 5, portion 15 of pivoted arm 12 will ultimately meet a second dog 16 returning it to its original position, thus dissolving the locking.

As has been emphasized above, the arrangement here shown and described does only constitute an example of how the invention may be put into practical use. Within the inventive concept it is possible in various ways to modify or supplement the components of the conveyor. Especially, as far as elements 11 are concerned, it should be stressed that they could have any suitable shape, the only essential condition being that, when not subjected to any external forces, they shall by gravity be held in their starting positions and that after having been brought into contact with the subject to be transported they should leave that position and instead individually and automatically conform to the cross-section of the subject. They should be somewhat spaced from each other which can be attained either by means of separate spacing sleeves or by suitably shaped hub portions. In some applications it is suitable to have means keeping the outermost elements, which are not in contact with the transported subject, in depressed positions so that they cannot by protruding above the top surfaces of the subject interfere with any treatment thereof. These means may simply be constituted by vertically adjustable plates mounted just below shafts 9. The word "chains" has been used here in a functional sense and should not be construed in a limiting way. Also the arrangement for blocking members 11 during transport may be replaced by any other suitable design.

What is claimed is:

1. A conveyor for elongated objects such as logs comprising a support framework, a pair of driven endless flexible members defining upper and lower flights, the upper flight moving in the direction of movement of conveyed objects, a plurality of spaced support means carried between said driven endless members, and a plurality of load support members carried by each of said support means in spaced relationship to one another, each of said load support members being swingably carried by the associated support means with the center of gravity of each of the load support members spaced from the swinging axis thereof whereby the load support members automatically conform to the shape of a conveyed object.

2. Apparatus as defined in claim 1 wherein said lateral support means comprise a plurality of laterally extending shafts the opposite ends of which are operatively connected with said driven endless members, said shaft being disposed in substantially equally spaced parallel relationship to one another.

3. Apparatus as defined in claim 1 wherein each of said load support members comprises an elongated member so arranged that the center of gravity thereof is normally disposed below the associated lateral support means when no load is disposed thereon with at least two-thirds of the elongated member being disposed below the associated lateral support means.

4. Apparatus as defined in claim 1 wherein the upper ends of each of said load support members in the freehanging position of the load support members slopes rearwardly of said direction of movement.

5. Apparatus as defined in claim 1 wherein the overall width of the plurality of load support members carried by each of the lateral support means is greater than the width of a supported conveyed object.

6. Apparatus as defined in claim 1 including control means swingably mounted on each of said lateral support means for locking the associated load support members in conforming position according to the object supported thereby.

7. Apparatus as defined in claim 6 wherein said control means comprises an arm, the upper portion of said arm being shorter than the upper portion of an adjacent load supporting member, the lower portion of said arm being longer than the lower portion of an adjacent load support member.

8. Apparatus as defined in claim 6 wherein said control means comprises an arm operatively connected with a first sleeve mounted on the associated support means, an adjacent load support member having a second sleeve operatively associated therewith, said first and second sleeves having complementary oblique end surfaces in engagement with one another whereby relative swinging movement of said arm with respect to the adjacent load support member produces a wedging locking action.

9. Apparatus as defined in claim 6 including a first trip means supported by said framework in position for engaging said control means to move said control means into position for locking the associated load support members in position.

10. Apparatus as defined in claim 9 including second trip means supported by said framework in position for engaging said control means to cause said control means to swing in a direction to unlock the associated load support members.

References Cited

FOREIGN PATENTS 569,476    2/1933    Germany.

EDWARD A. SROKA, Primary Examiner

U.S. Cl. X.R.

143—49; 144—245; 198—189